US012318035B2

(12) United States Patent
Wann

(10) Patent No.: US 12,318,035 B2
(45) Date of Patent: Jun. 3, 2025

(54) NETWORKED FOOD PREPARATION APPARATUS

(71) Applicant: Duke Manufacturing Co., St. Louis, MO (US)

(72) Inventor: Benjamin Kingbay Wann, St. Louis, MO (US)

(73) Assignee: DUKE MANUFACTURING CO., St. Louis, MO (US)

( * ) Notice: Subject to any disclaimer, the term of this patent is extended or adjusted under 35 U.S.C. 154(b) by 287 days.

(21) Appl. No.: 18/174,044

(22) Filed: Feb. 24, 2023

(65) Prior Publication Data

US 2023/0263339 A1   Aug. 24, 2023

Related U.S. Application Data

(63) Continuation-in-part of application No. 17/906,096, filed as application No. PCT/US2021/022925 on Mar. 18, 2021.

(Continued)

(51) Int. Cl.
*A47J 36/32* (2006.01)
*H04L 12/40* (2006.01)
*H04W 84/18* (2009.01)

(52) U.S. Cl.
CPC ............ *A47J 36/321* (2018.08); *H04L 12/40* (2013.01); *H04W 84/18* (2013.01); *H04L 2012/40215* (2013.01)

(58) Field of Classification Search
CPC ................... A47J 36/321; H04L 12/40; H04L 2012/40215; H04W 84/18
See application file for complete search history.

(56) References Cited

U.S. PATENT DOCUMENTS 5,798,694 A   8/1998   Reber et al.
6,104,966 A   8/2000   Haagensen
(Continued)

FOREIGN PATENT DOCUMENTS

CN   203084467 U   7/2013
CN   104134087 A   11/2014
(Continued)

OTHER PUBLICATIONS

Sandeep, Manasa et al., Implementation of Iot Based Smart Cooking Environment, pp. 192-195 (2019) 1st International Conference on Advanced Technologies in Intelligent Control, Environment, Computing & Communication Engineering (ICATIECE) (Mar. 19, 2019).

(Continued)

*Primary Examiner* — Laura A Gudorf
(74) *Attorney, Agent, or Firm* — Stinson LLP

(57) ABSTRACT

A kitchen network system comprising a plurality of food preparation apparatuses, each comprising a single board computer communicatively coupled to a wireless mesh network. The single board computer comprises a processor, a built-in antenna, and one or more memory devices communicatively coupled to the processor. The memory devices store a database containing provisioning and configuration data for at least two of the nodes of the mesh network. The processor transmits and receives data on the mesh network via the antenna, generates a control signal for controlling an operation of the food preparation apparatus, and communicates the control signal on a physical data bus according to a message-based protocol. An input/output (I/O) circuit communicatively coupled to the single board computer via the physical data bus is responsive to the control signal for driving one or more components of the food preparation apparatus to perform the operation.

20 Claims, 9 Drawing Sheets

Related U.S. Application Data

(60) Provisional application No. 63/313,370, filed on Feb. 24, 2022, provisional application No. 62/991,248, filed on Mar. 18, 2020.

(56) References Cited

U.S. PATENT DOCUMENTS

| | | |
|---|---|---|
| 6,600,418 B2 | 7/2003 | Francis et al. |
| 7,116,230 B2 | 10/2006 | Klowak |
| 7,132,926 B2 | 11/2006 | Vaseloff et al. |
| 7,258,064 B2 | 8/2007 | Vaseloff et al. |
| 7,411,502 B2 | 8/2008 | Collins et al. |
| 7,474,210 B2 | 1/2009 | Roberts et al. |
| 7,525,434 B2 | 4/2009 | Batra |
| 7,628,107 B2 | 12/2009 | Vaseloff et al. |
| 7,650,833 B2 | 1/2010 | Pardoe et al. |
| 7,905,173 B2 | 3/2011 | Sus et al. |
| 7,922,961 B2 | 4/2011 | Chisholm et al. |
| 7,973,642 B2 | 7/2011 | Schackmuth et al. |
| 8,102,264 B2 | 1/2012 | Rinkes et al. |
| 8,164,457 B2 | 4/2012 | Dunlap et al. |
| 8,228,200 B2 | 7/2012 | Kolton et al. |
| 8,416,080 B2 | 4/2013 | Higham |
| 8,695,489 B2 | 4/2014 | Ewald et al. |
| 8,786,443 B2 | 7/2014 | Selgrath et al. |
| 8,844,814 B2 | 9/2014 | Chang et al. |
| 9,000,896 B1 | 4/2015 | Kim et al. |
| 9,176,832 B2 | 11/2015 | Vasseur et al. |
| 9,193,535 B2 | 11/2015 | Tanaka |
| 9,288,612 B2 | 3/2016 | Locker et al. |
| 9,445,625 B2 | 9/2016 | Burkett et al. |
| 9,487,322 B2 | 11/2016 | Wilkinson |
| 9,746,842 B2 | 8/2017 | Reese et al. |
| 9,798,987 B2 | 10/2017 | Chapman et al. |
| 9,917,903 B2 | 3/2018 | Clernon |
| 9,965,734 B2 | 5/2018 | Chapman, III et al. |
| 9,974,015 B2 | 5/2018 | Zakaria et al. |
| 9,977,928 B2 | 5/2018 | Sehmer et al. |
| 10,079,691 B2 | 9/2018 | Christopher et al. |
| 10,111,070 B2 | 10/2018 | Zakaria et al. |
| 10,111,071 B2 | 10/2018 | Polo et al. |
| 10,304,020 B2 | 5/2019 | Chapman, III et al. |
| 10,426,282 B1 | 10/2019 | Hamilton |
| 10,440,546 B2 | 10/2019 | Polo et al. |
| 10,546,161 B2 | 1/2020 | Sehmer et al. |
| 10,735,261 B2 | 8/2020 | Pillai |
| 10,839,170 B2 | 11/2020 | Sehmer et al. |
| 10,841,874 B2 | 11/2020 | Zakaria et al. |
| 10,848,567 B1 | 11/2020 | Von Muenster et al. |
| 10,863,234 B2 | 12/2020 | Jabara et al. |
| 10,932,107 B2 | 2/2021 | Bae et al. |
| 10,951,435 B2 | 3/2021 | Jakobsson |
| 11,023,851 B2 | 6/2021 | Schoening |
| 11,080,482 B2 | 8/2021 | Donati et al. |
| 11,082,837 B2 | 8/2021 | Zavesky et al. |
| 11,105,909 B2 | 8/2021 | Argentieri et al. |
| 11,124,367 B2 | 9/2021 | Moore et al. |
| 11,128,486 B2 | 9/2021 | Yang et al. |
| 11,176,515 B2 | 11/2021 | Godlewski |
| 2002/0018705 A1 | 2/2002 | Kawaguchi |
| 2005/0211775 A1 | 9/2005 | Vaseloff et al. |
| 2006/0085266 A1 | 4/2006 | Wei et al. |
| 2007/0144202 A1 | 6/2007 | Theodos et al. |
| 2007/0251521 A1 | 11/2007 | Schackmuth et al. |
| 2007/0251667 A1 | 11/2007 | Ewald et al. |
| 2009/0014279 A1 | 1/2009 | Bouetard |
| 2009/0266736 A1 | 10/2009 | Sprishen et al. |
| 2012/0032524 A1 | 2/2012 | Baarman et al. |
| 2012/0323392 A1 | 12/2012 | Gerdes et al. |
| 2016/0019451 A1 | 1/2016 | Selgrath et al. |
| 2016/0327279 A1* | 11/2016 | Bhogal ............... F24C 15/008 |
| 2017/0041861 A1 | 2/2017 | Fuhrmann |
| 2017/0071411 A1 | 3/2017 | Veltrop et al. |
| 2017/0071412 A1 | 3/2017 | Veltrop et al. |
| 2017/0134255 A1 | 5/2017 | Amini et al. |
| 2017/0290466 A1 | 10/2017 | Lundberg et al. |
| 2018/0048481 A1 | 2/2018 | Wann et al. |
| 2018/0081331 A1 | 3/2018 | Gary, Jr. et al. |
| 2019/0075970 A1 | 3/2019 | Patterson et al. |
| 2019/0095663 A1 | 3/2019 | Ayette |
| 2019/0125120 A1 | 5/2019 | Jenkins et al. |
| 2019/0339686 A1 | 11/2019 | Cella et al. |
| 2020/0048009 A1 | 2/2020 | Moore et al. |
| 2020/0074522 A1 | 3/2020 | Balasubramanian et al. |
| 2020/0146504 A1 | 5/2020 | Patterson |
| 2020/0213101 A1 | 7/2020 | Zimmerman et al. |
| 2020/0349544 A1 | 11/2020 | Perarnau Pradell |
| 2020/0349795 A1 | 11/2020 | Wann et al. |
| 2021/0125142 A1 | 4/2021 | Bloom et al. |
| 2021/0127251 A1 | 4/2021 | Kang et al. |
| 2021/0216953 A1 | 7/2021 | Ramos |
| 2021/0352764 A1 | 11/2021 | Hamlin et al. |

FOREIGN PATENT DOCUMENTS

| | | |
|---|---|---|
| CN | 109358535 A | 2/2019 |
| CN | 109890065 A * | 6/2019 |
| CN | 110392445 A | 10/2019 |
| CN | 111010324 A | 4/2020 |
| CN | 111090243 A | 5/2020 |
| CN | 111263338 A | 6/2020 |
| CN | 112217694 A | 1/2021 |
| CN | 112261631 A | 1/2021 |
| FR | 2885435 A1 | 11/2006 |
| KR | 2012129043 A | 11/2012 |
| MX | 2019004073 A | 11/2019 |
| TW | M388892 U | 9/2010 |
| TW | 201626767 A | 7/2016 |
| WO | 2007042248 A1 | 4/2007 |
| WO | 2012/121616 A1 | 9/2012 |
| WO | 2012/152293 A1 | 11/2012 |
| WO | 2019/100014 A1 | 5/2019 |
| WO | 2021/134562 A1 | 8/2021 |
| WO | 2021/188775 A1 | 9/2021 |

OTHER PUBLICATIONS

International Search Report and Written Opinion dated Jun. 15, 2023 relating to PCT Patent Application No. PCT/US23/13804, 17 pages.

RFID Reader User Manual Rev 1.0, User Manual RFID Reader Board (Welbilt), 14 pages (No date available).

* cited by examiner

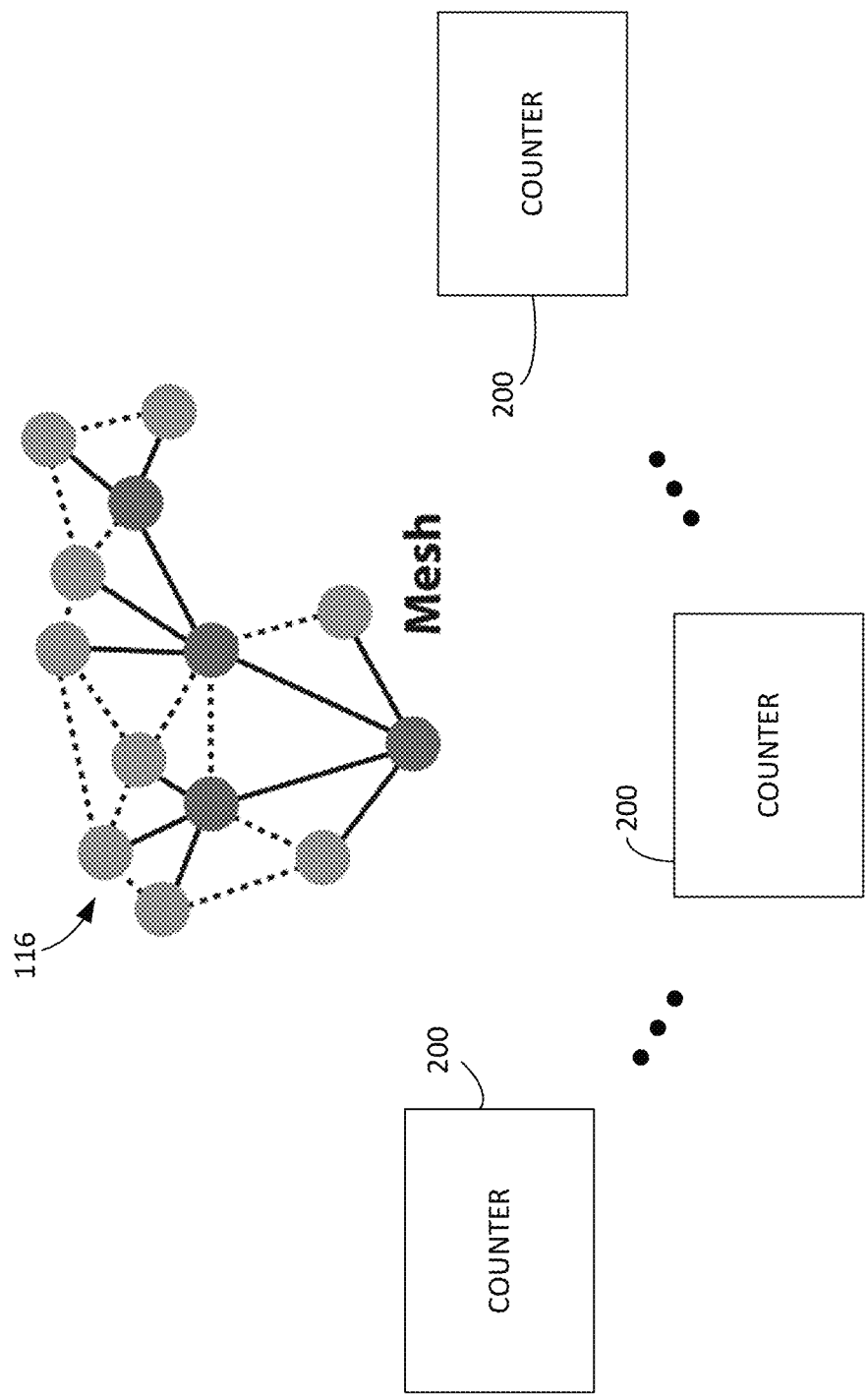

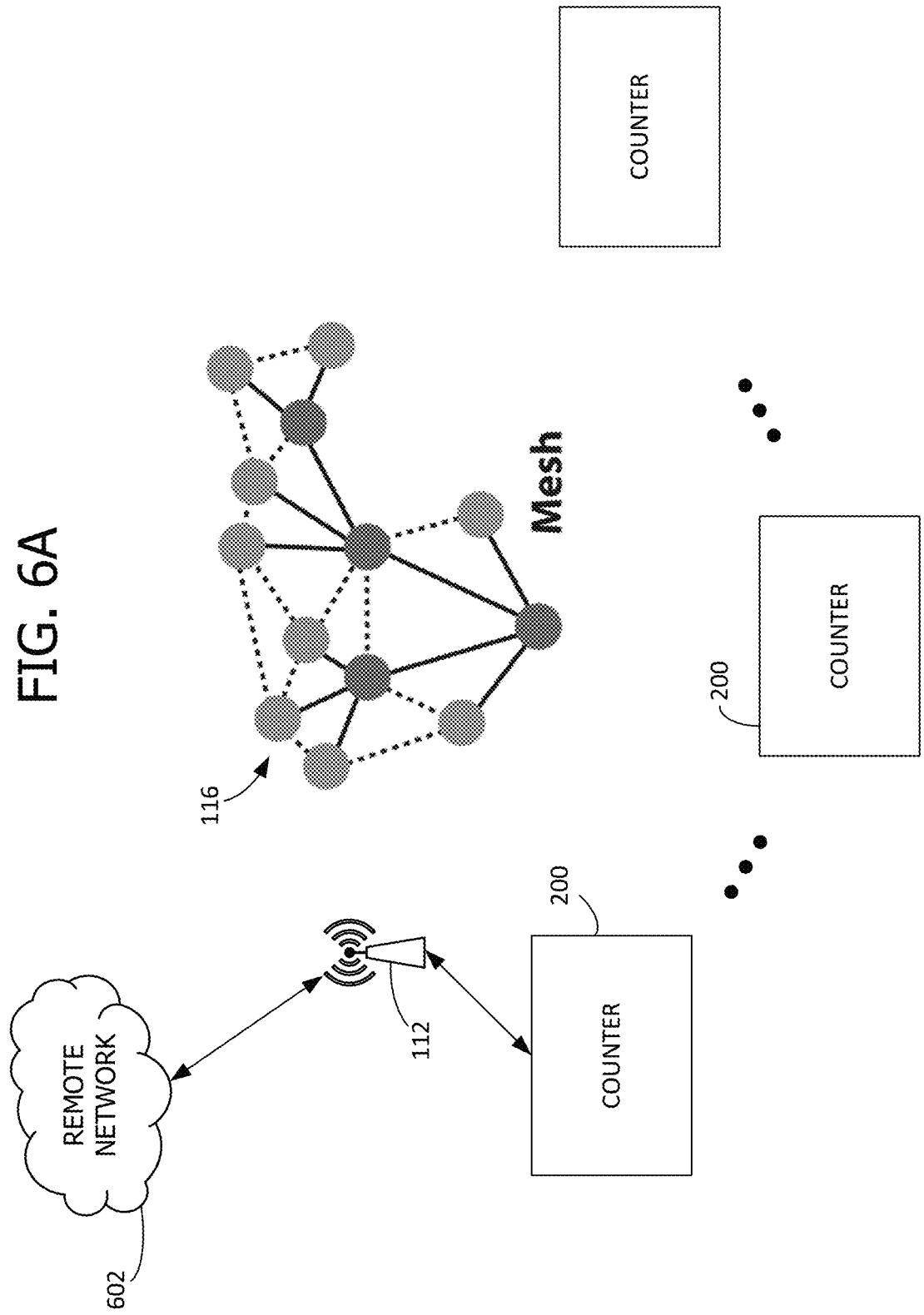

NETWORKED FOOD PREPARATION APPARATUS

CROSS-REFERENCE TO RELATED APPLICATIONS

This application claims priority to U.S. Provisional Patent Application No. 63/313,370, filed Feb. 24, 2022, and is a continuation-in-part of U.S. patent application Ser. No. 17/906,096, filed Sep. 12, 2022, the entire disclosures of which are incorporated herein by reference.

BACKGROUND

The present disclosure generally relates to a networked food preparation apparatus, and more particularly to a food preparation apparatus configured to communicate on a low power wireless mesh (e.g., Bluetooth mesh) network.

Food preparation establishments such as restaurants, including quick service or fast food restaurants, have kitchens including various food preparation apparatuses. Conventional techniques for controlling and managing such apparatuses present several challenges. For example, such kitchens often include food preparation apparatuses from several different manufacturers using different communications protocols that cannot securely communicate with each other and with a central kitchen management system.

SUMMARY

In an aspect, a kitchen network system comprises a plurality of food preparation apparatuses. Each of the food preparation apparatuses includes a single board computer communicatively coupled to a wireless mesh network. The mesh network has a plurality of nodes, wherein the single board computer is one of the nodes of the mesh network. The single board computer comprises a processor, a built-in antenna, and one or more memory devices communicatively coupled to the processor. The memory devices store a database containing provisioning and configuration data for at least two of the nodes of the mesh network. The memory devices further store processor-executable instructions that, when executed by the processor, transmit and receive data on the mesh network via the antenna, generate a control signal for controlling an operation of the food preparation apparatus, and communicate the control signal on a physical data bus according to a message-based protocol. The system also includes an input/output (I/O) circuit communicatively coupled to the single board computer via the physical data bus and configured to receive the control signal therefrom. The I/O circuit is responsive to the control signal for driving one or more components of the food preparation apparatus to perform the operation.

In another aspect, a method of managing a plurality of food preparation apparatuses comprises provisioning at least first and second single board computers as nodes on a mesh network. A first food preparation apparatus includes the first single board computer and a second food preparation apparatus includes the second single board computer. The method also includes storing provisioning and configuration data for each the nodes of the mesh network in a database associated with each of the first and second single board computers. The method further includes generating, by the first single board computer, a control signal for controlling an operation of the first food preparation apparatus associated therewith and communicating the control signal from the first single board computer to a corresponding I/O circuit of the first food preparation apparatus. The control signal is communicated via a physical data bus according to a message-based protocol, and the I/O circuit of the first food preparation apparatus is responsive to the control signal for driving one or more components of the first food preparation apparatus to perform the operation.

Other objects and features of the present invention will be in part apparent and in part pointed out herein.

BRIEF DESCRIPTION OF THE DRAWINGS

FIGS. 2A and 2B illustrate example food preparation apparatuses for use in the network of FIG. 1.

FIGS. 3-5 and 6A-6C are diagrams illustrating further aspects of the example food preparation apparatuses of FIG. 2B.

Corresponding reference characters indicate corresponding parts throughout the drawings.

DETAILED DESCRIPTION

Figure 1:
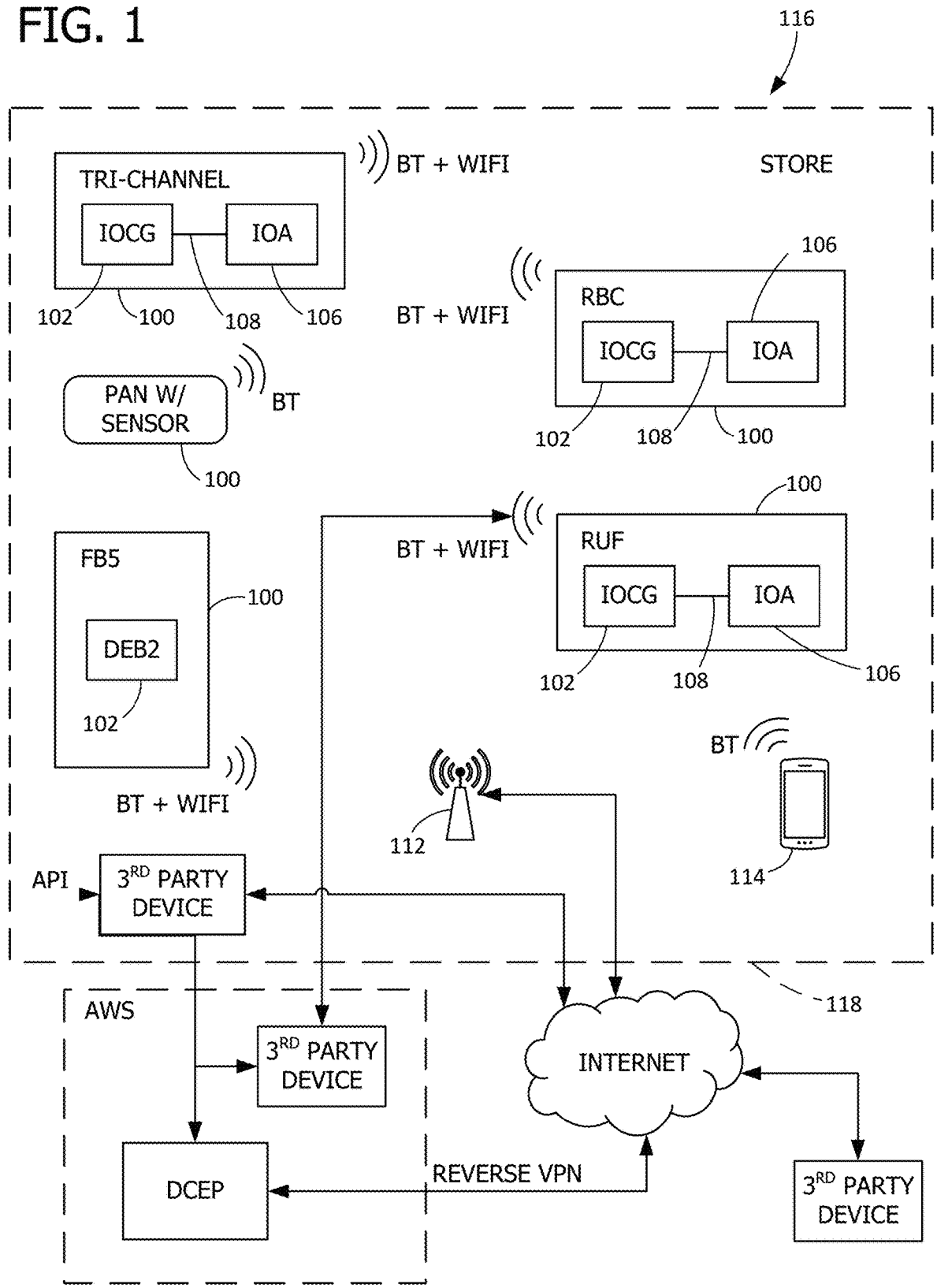
FIG. 1 is a diagram of a kitchen network of food preparation apparatuses according to an embodiment of the present invention.

Referring to the drawings, FIG. 1 illustrates a plurality of food preparation apparatuses 100 embodying aspects of the present invention. In the illustrated example, each food preparation apparatus 100 is configured as a food preparation apparatus for use in a food preparation establishment, such as a restaurant or other commercial kitchen, including a quick service or "fast food" restaurant. In an aspect, food preparation apparatus 100 is part of a food preparation establishment network system used for "smart kitchen" purposes, such as forecasting or predicting food that will be ordered in the future, preparing food, monitoring food preparation and food inventory, providing indications and instructions regarding food preparation and food inventory, labor scheduling management, asset tracking, smart appliance communication, sensor network integration, global inventory control, facilitating communications between devices in the network for these and other purposes, and the like. Commonly assigned International Application No. PCT/US2021/022925, the entire disclosure of which is incorporated herein by reference, discloses a networked kitchen system in which aspects of the present disclosure may be used.

The food preparation apparatus 100 may include various food cooking devices. An example of one such cooking device is an oven, and it will be understood that other cooking devices, such as fryers, microwaves, conditioning cabinets (e.g. for dough, etc.), grills, and the like can be used without departing from the scope of the present invention. The food preparation apparatuses 100 may also include one or more food holding units adapted for holding food at a suitable temperature (e.g., cool temperature, ambient temperature, and/or warm temperature) such as refrigerated back counters (RBC), tri-channel cold pan counters, steam tables, infrared holding units, heat sink holding units, reach-in under-counter refrigerators or freezers (RUF), hot/cold/freeze or hot/cold/frost units, or other holding units, etc. The food preparation apparatus 100 may also include various other food handling apparatuses such as food washers, sanitizers, processors, pans equipped with position sensors, etc.

Referring further to FIG. 1, the apparatus 100 in the illustrated embodiment includes a single board computer 102, a touchscreen controller (not shown), and an I/O circuit 106. In an embodiment, the single board computer 102 includes a processor, a memory, and a data bus interface; the touchscreen controller includes a processor, a flash data memory (RAM), a data bus interface, and an electronically erasable programmable read-only memory (EEPROM); and the I/O circuit 106 includes a processor, a flash data memory, and a data bus interface. The single board computer 102, touchscreen controller, and I/O circuit 106 are communicatively coupled to each other through a physical data bus 108 via their respective data bus interfaces. In the illustrated embodiment, single board computer 102 is configured to execute the operations of the touchscreen controller. In another embodiment, single board computer 102, touchscreen controller, and/or I/O circuit 106 could be embodied on the same printed circuit board, in which case a physical data bus may not be used for communication between the components.

Commonly assigned International Application No. PCT/US2018/061844, the entire disclosure of which is incorporated herein by reference, discloses the single board computer 102 configured to bridge the physical data bus 108 with a virtual data bus, store recipes, and provide, via a web server, a graphical user interface (GUI) for enabling a user of a client computer to configure recipe settings and/or firmware settings for food preparation apparatus 100, as further described herein. The single board computer 102 provides a core app, a web server, a database, and a virtual communication bus via a software environment (e.g., processor 102A executing processor readable instructions stored on memory 102B, etc.), as further described herein. The single board computer 102 may be referred to as an embedded computing device, an embedded computer, an embedded control device, and/or an embedded controller in accordance with one or more aspects of the disclosure.

The I/O circuit 106 is configured to control various loads (e.g., heaters, valves, fans, etc.) in apparatus 100 based on commands from single board computer 102. In an embodiment, I/O circuit 106 (referred to as IOA in FIG. 1) includes power, relays, switch inputs, a resistance temperature detector (RTD), or the like. The I/O circuit 106 is configurable with four DIP switches or jumpers, for example, to accommodate 16 different outputs.

The physical data bus 108 is configured to facilitate the exchange of data among the control components of apparatus 100, such as single board computer 102 and I/O circuit 106. The single board computer 102 and I/O circuit 106 are configured to publish messages (e.g., data) to the physical data bus 108 and subscribe to messages on the physical data bus 108. In this manner, single board computer 102 and I/O circuit 106 are configured to communicate via a publish/subscribe ("pub/sub") protocol. In an embodiment, physical data bus 108 is a Controller Area Network (CAN) bus.

FIG. 1 further illustrates one embodiment of a network system embodying aspects of the present invention that includes the food preparation apparatus 100, a router 112, and a local computer 114 communicatively coupled via a communications network 116. In the illustrated embodiment, the local computer 114 is a smartphone but could be embodied by a variety of computing devices. In an embodiment, the communications network 116 comprises at least in part a kitchen network. In another embodiment, the communications network 116 comprises at least in part a food preparation establishment network system used for "smart kitchen" purposes.

According to aspects of the present disclosure, the communications network 116 comprises a mesh network on which one or more food preparation apparatus 100, router 112, and local computer 114 are nodes. Those skilled in the art are familiar with mesh networks in which infrastructure nodes (e.g., bridges, switches, and other infrastructure devices) connect directly, dynamically, and non-hierarchically to as many other nodes as possible in a many-to-many relationship and cooperate with one another to efficiently route data from/to clients. For example, food preparation apparatus 100, router 112, and local computer 114 may all be physically located within the same food preparation establishment 118, such as a restaurant or other commercial kitchen, including a quick service or "fast food" restaurant. In an embodiment, a plurality of food preparation apparatuses 100 is communicatively coupled to the router 112 and/or local computer 114 via mesh network 116. The router 112 is configured to communicatively couple food preparation apparatus 100 and local computer 114 on mesh network 116 to an external communications network such as the internet.

In an embodiment, the single board computer 102 of one or more of the apparatuses 100 is configured for low energy communications in accordance with, for example, the Bluetooth Low Energy (BLE) standard and mesh network 116 comprises a Bluetooth mesh network. For example, single board computer 102 (referred to as IOCG in FIG. 1) has built-in Bluetooth and Wi-Fi capabilities. The single board computer 102 can function as a gateway thus eliminating the need for a separate Zigbee or similar gateway. Accordingly, the single board computer 102 in this embodiment can be a node on mesh network 116 and/or a wireless gateway. As nodes, the single board computers 102 of food preparation apparatuses 100 are configurable to receive firmware updates via mesh network 116. The local computer 114 is configurable to operate as a "master control" computer on the Bluetooth mesh network 116 for changing settings on devices, set auto schedules, update firmware, etc. In one example, the local computer 114 can be used to make updates to software, firmware, and/or operational settings of some or all of the apparatuses 100 in bulk (e.g., pushing updates/changes to all of the apparatuses in a group instead of updating each individual apparatus in separate processes). Via the mesh network 116, the local computer 114 can pair with all of the nodes in a "one-to-many" arrangement which has efficiency and other advantages over a "one-to-one" pairing arrangement.

Moreover, each apparatus 100 is configurable such that it has its own CAN bus network. For instance, I/O circuits 106 output messages to physical data bus 108, which is a CAN bus. The mesh network (i.e., communications network 116) connects to CAN bus networks within the store 118. A smartphone (i.e., local computer 114), can connect to the mesh network 116 via a proxy server. Connecting to the mesh network 116 enables connection to the CAN communications in apparatuses 100 as well as connection to a cloud-based to Internet of Things (I) platform, such as the SousChef Cloud, which handles recipe management, operation management, equipment/asset management, etc. In other words, single board computer 102 functions to merge or bridge CAN bus and wireless networks. A user can pull diagnostics and/or maintenance information from every node on mesh network 116 via a mobile app executing on the smartphone. In this embodiment, local computer 114 need not be coupled directly to the mesh network 116, which prevents the risk of an outside maintenance person accessing the restaurant's internal network.

Aspects of the present disclosure permit layers of authentication keys for improved network security. A Bluetooth mesh network requires multiple layers of encryption. In an embodiment, the manufacturer ships a network key stored in single board computer 102 and maintains a master key. A mobile phone app stores a network key, which it receives from the manufacturer for authentication. The app mates with the food preparation apparatus 100 that was shipped with the same key to connect to the network 116. Encryption/authentication can be extended to third party devices from different vendors by having these devices on the master key and then having a second layer key specific to the first party manufacturer. Multiple vendors could communicate via the same Bluetooth mesh network, all encrypted/isolated in Bluetooth from each other or could share authentication keys (different levels to permit sharing).

Figure 2B:
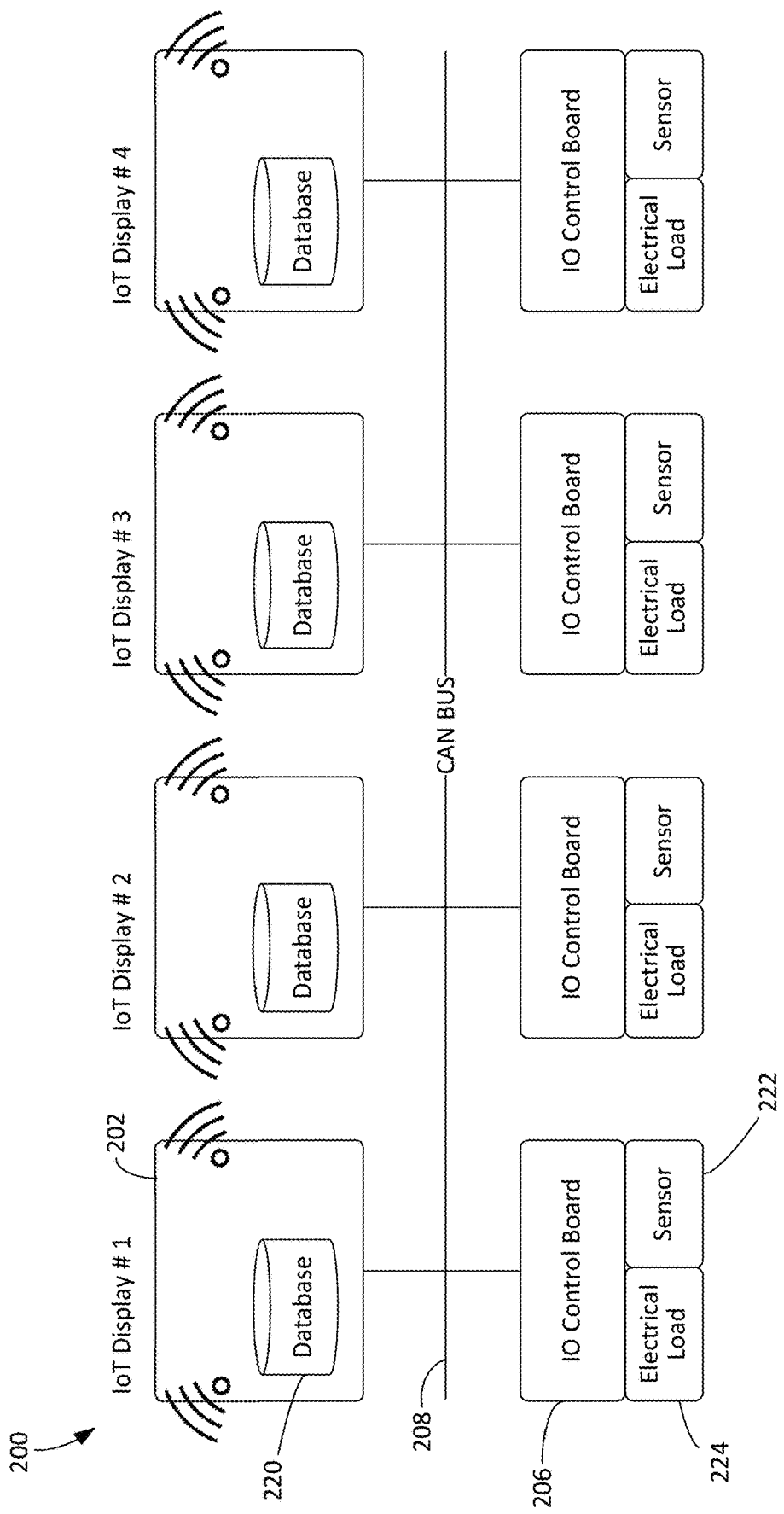

FIG. 2A illustrates a kitchen network system in the form of a counter control system embodying aspects of the present disclosure. The system includes a plurality of networked counters 200, each embodying a food preparation apparatus 100. FIG. 2B illustrates the components of one of the counters 200 in greater detail. In the illustrated embodiment, each networked counter 200 includes a plurality of single board computers 102 (referred to as IoT displays 202 in FIG. 2B). Each of the IoT displays 202 in the embodiment of FIGS. 2A-2B includes an antenna (e.g., a multi-directional radiating element) and is configured to serve as a node on mesh network 116. In addition, each IoT display 202 is coupled to, or paired with, a corresponding I/O circuit 106 via the physical data bus 108. As shown in FIG. 2B, each I/O circuit 106 is embodied by an IO control board 206 and the physical bus 108 is embodied by a CAN bus 208. Each IoT display 202 has a unique address on the CAN bus 208, a unique media access control (MAC) address on the mesh network 116, and a unique serial number address.

The IoT displays 202 each include a database 220 storing information about the mesh network 116 in each node as well as information related to the paired IO control boards 206. For example, the database 220 stores calibration offsets, serial number information, configuration data, physical addresses on CAN bus 208, and the like. In an embodiment, the databases 220 of IoT displays 202 each store control serial number configuration data for their sibling IoT displays so that each pair can be replicated on the mesh network 116. Moreover, because each database 220 stores provisioning data for its corresponding node as well as the other nodes, provisioning of mesh network 116 is more easily accomplished.

The IO control boards 206 each control one or more components of counter 200 (e.g., lights, pumps, temperature). For purposes of illustration, FIG. 2B shows each IO control board 206 coupled to a sensor 222 and an electrical load 224. By restricting the commands received by IO control board 206 to those communicated via the physical CAN bus 208, the counter control system of FIGS. 2A-2B improves overall security. In an embodiment, each of the IoT displays 202 has a touchscreen coupled to it that is configured for interaction with a user to permit direct user control of the one or more components of counter 200. In addition, the touchscreen may be used for inputting a personal identification (PIN) code or the like to lock or unlock the paired IO control board 206.

Figure 3:
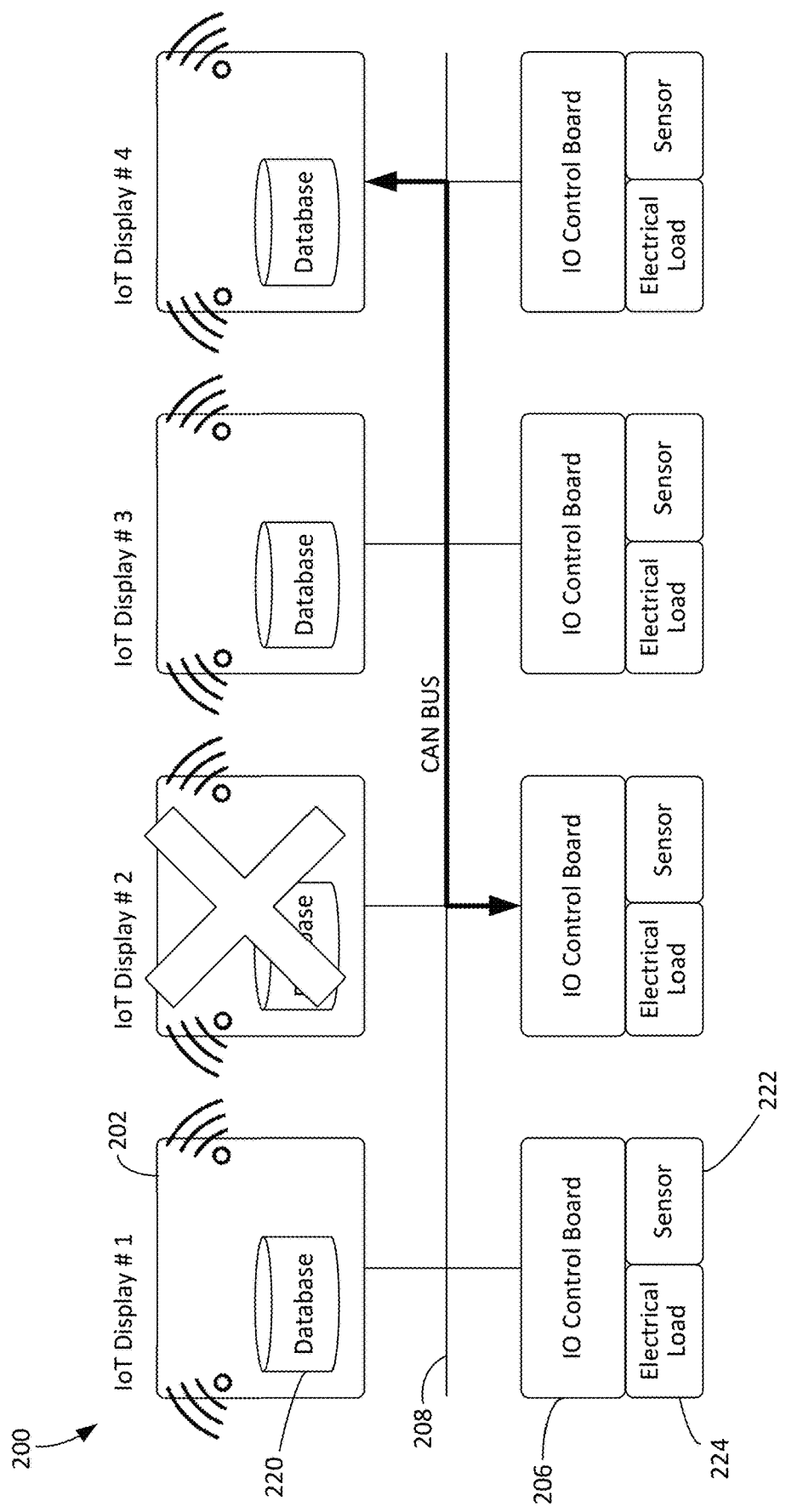

In FIG. 3, the counter control system of FIG. 2B experiences a failed node. For example, when any individual IoT display 202 (indicated at "IoT Display #2" in FIG. 3) is destroyed or otherwise missing from the mesh network 116, the distributed system detects this state and allows for a sibling IoT display 202 (indicated at "IoT Display #4" in FIG. 3) to stand in as a controller thus providing redundant control of the IO control board 206 previously associated with the failed node. The IoT displays 202 collect status information regarding their paired IO control boards 206 via CAN bus 208 and provide the status information to each other using, for example, a Raft consensus algorithm. As shown in the example of FIG. 3, IoT Display #2 is no longer on mesh network 116 and no longer communicates with its corresponding IO control board 206. Instead, the IoT Display #4 detects that its sibling IoT Display #2 is missing and sends/receives data and commands via CAN bus 208 to provide for seamless control of the respective IO control board 206 previously paired with IoT Display #2. In an embodiment, a user designates which IoT display 202 stands in for the failed controller and stores this information in database 220. According to aspects of the present disclosure, the stand-in IoT display 202 replaces control rather than merely re-routing communications to avoid a failed node.

Figure 4:
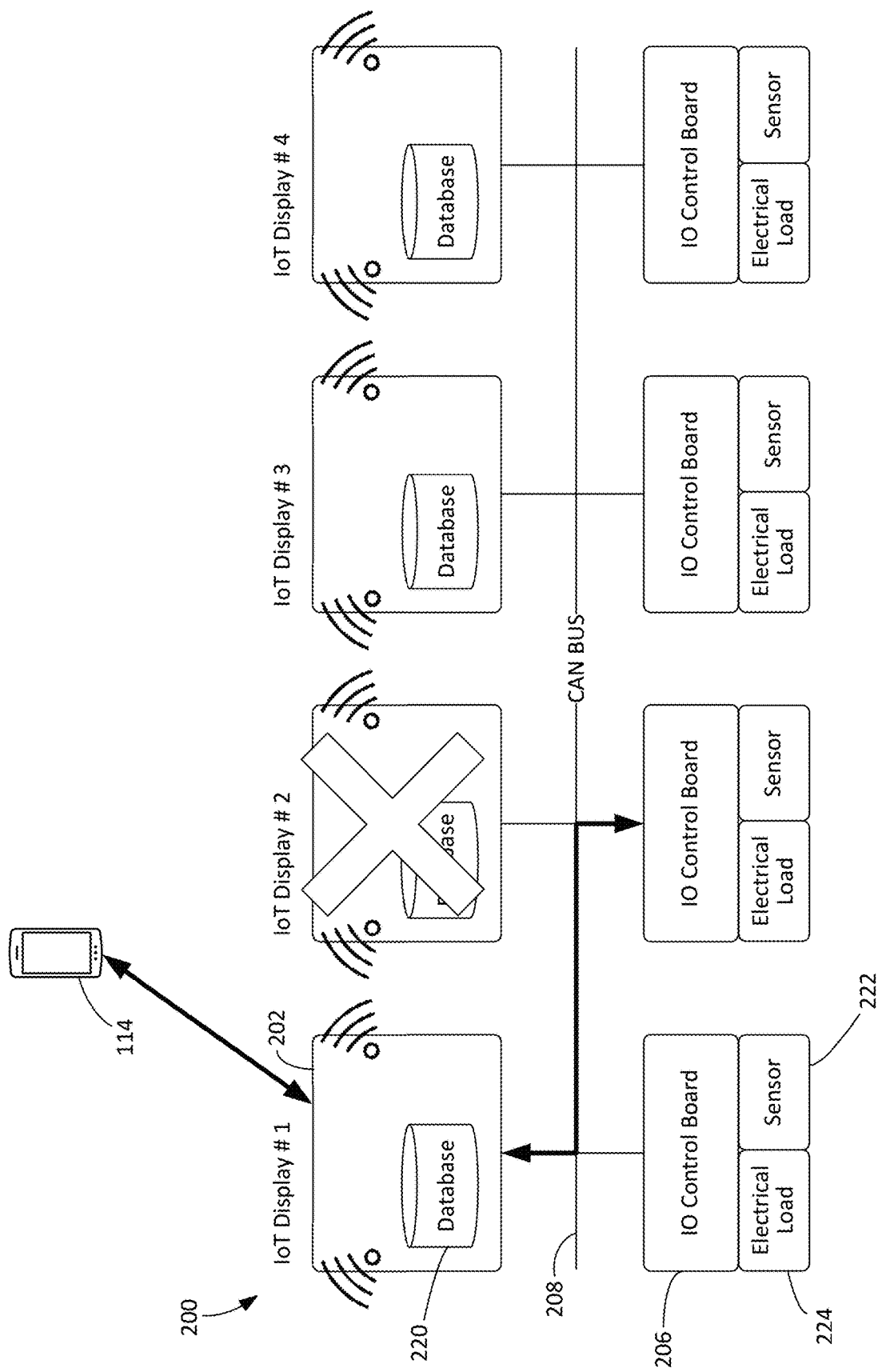

Referring now to FIG. 4, the counter control system of FIG. 2B again experiences a failed node (indicated at "IoT Display #2" in FIG. 4). When the distributed system detects this state, a sibling IoT display 202 (indicated at "IoT Display #1" in FIG. 4) stands in as a controller. As shown in the example of FIG. 4, the local computer 114, such as a smartphone executing a mobile application, sends commands to the IO control board 206 corresponding to the failed IoT display 202 via the "closest" node in the mesh network 116 that is also connected on CAN bus 208. In the illustrated embodiment, local computer 114 connects to the mesh network 116 as a BLE proxy node and the closest node is IoT Display #1. In this manner, the mobile application acts as a control element paired with the closest IoT display 202 (i.e., IoT Display #1). The mobile application executing on local computer 114 sends commands to and receives data from the respective IO control board 206 previously paired with IoT Display #2 via another one of the IoT displays 202, namely, IoT Display #1.

Figure 5:
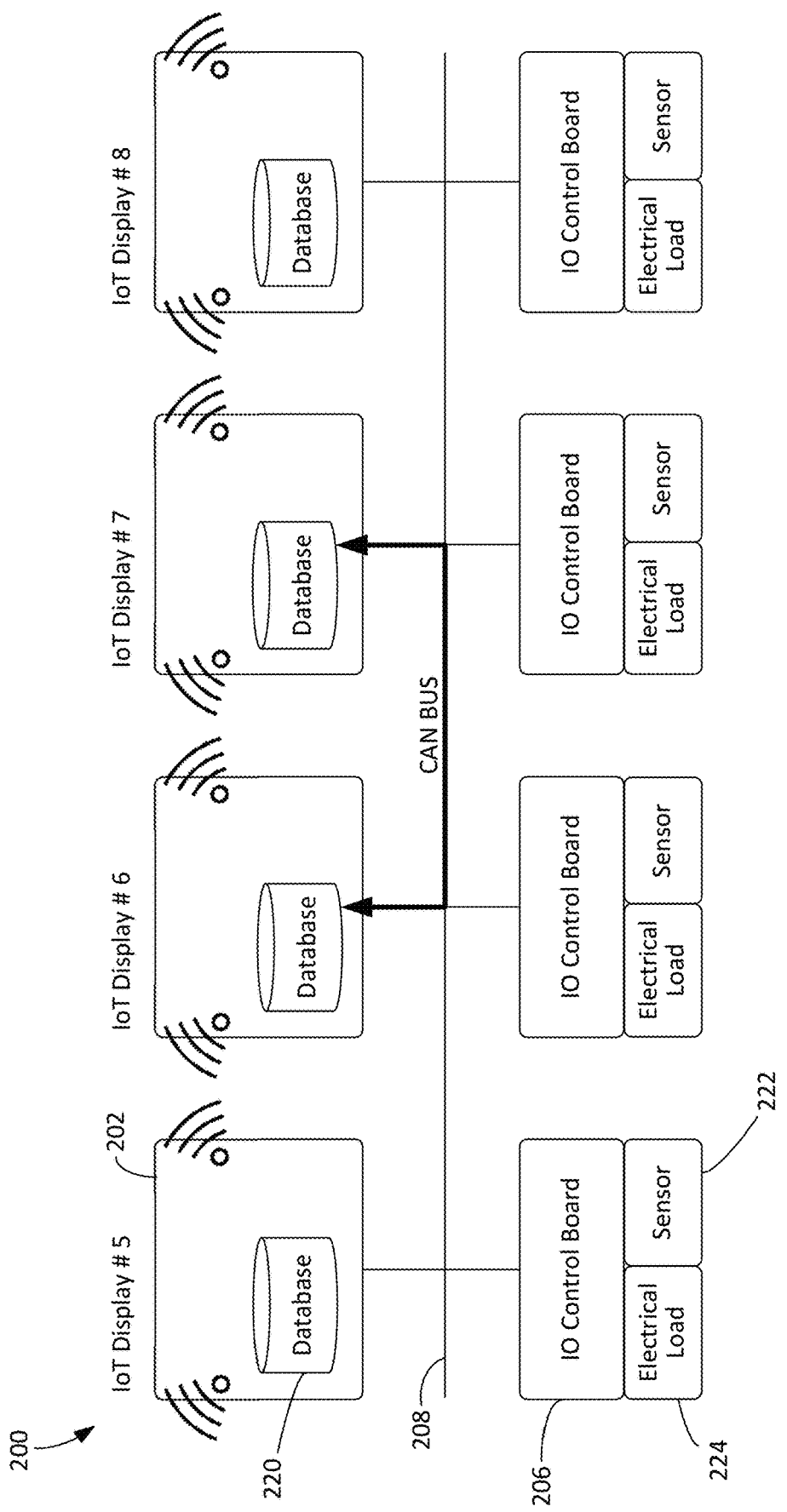

Referring now to FIG. 5, aspects of the present disclosure facilitate replacement of damaged IoT displays 202. In the event one of the IoT displays 202 (indicated at "IoT Display #7" in FIG. 5) needs to be replaced in the field, the remaining IoT displays 202 coupled to CAN bus 208 are configured to detect the new "bare" board. For example, FIG. 5 illustrates an embodiment in which IoT Display #7 has been replaced and, thus, is a bare board. The new IoT Display #7 is not yet configured to connect to mesh network 116 but it is recognized as a legitimate replacement because it is physically connected to CAN bus 208. One of the IoT displays 202 (indicated at "IoT Display #6" in FIG. 5) detects the new board and provides a set of steps for configuring the bare board. In the example of FIG. 5, IoT Display #6 provides a set of steps to replace the BLE mesh secrets that the replaced IoT Display #7 previously used for connecting to mesh network 116. In this regard, IoT Display #6 stores the necessary encryption keys in a flash memory and reprograms the new IoT Display #7 with the necessary security keys to communicate on mesh network 116. To avoid a loss of data for the IO control board 206 previously paired with the replaced IoT display 202, IoT Display #6 trains the replacement IoT Display #7 based on the control serial number configurations from the sibling databases 220.

Figure 6B:
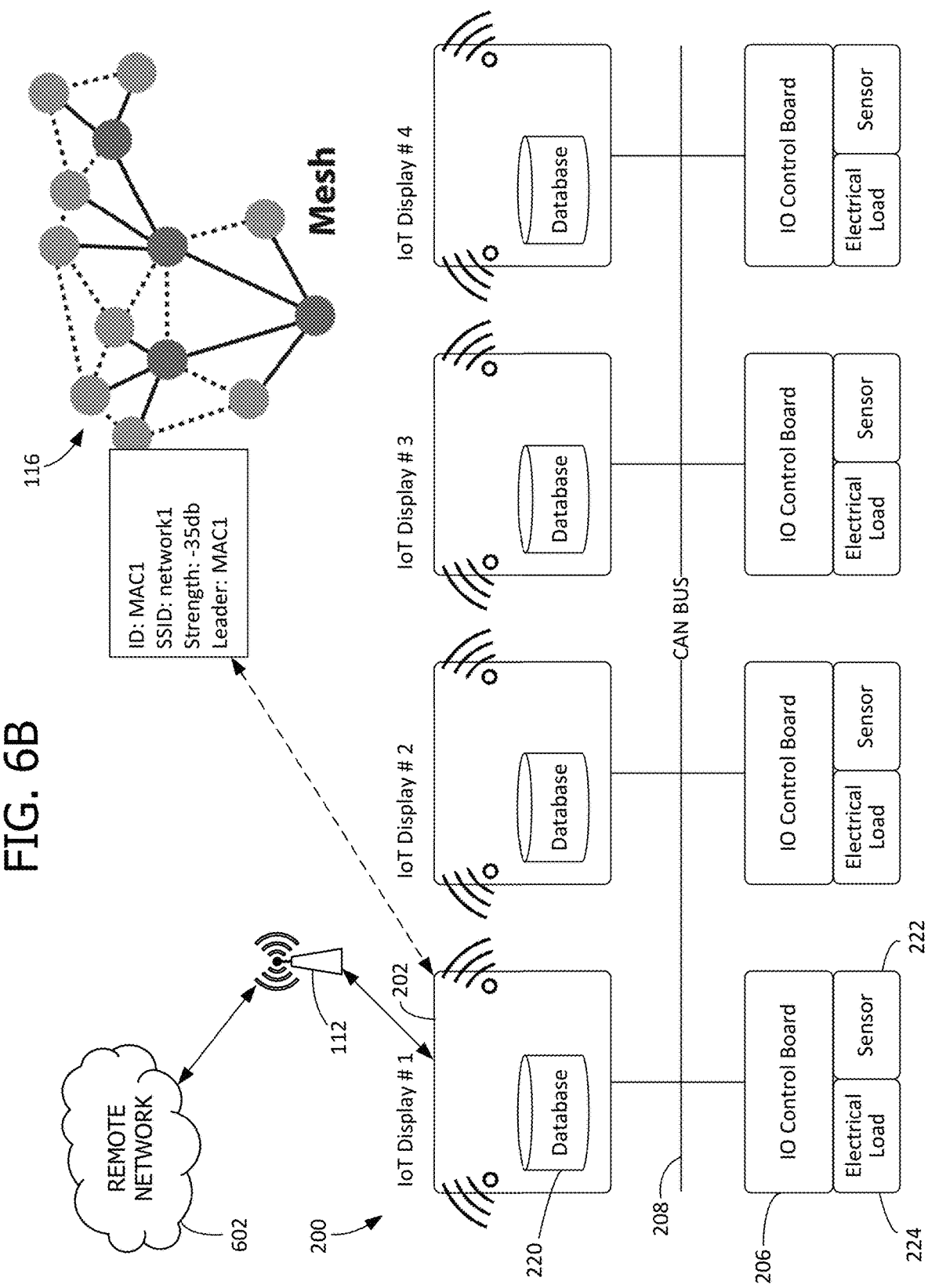
Figure 6C:
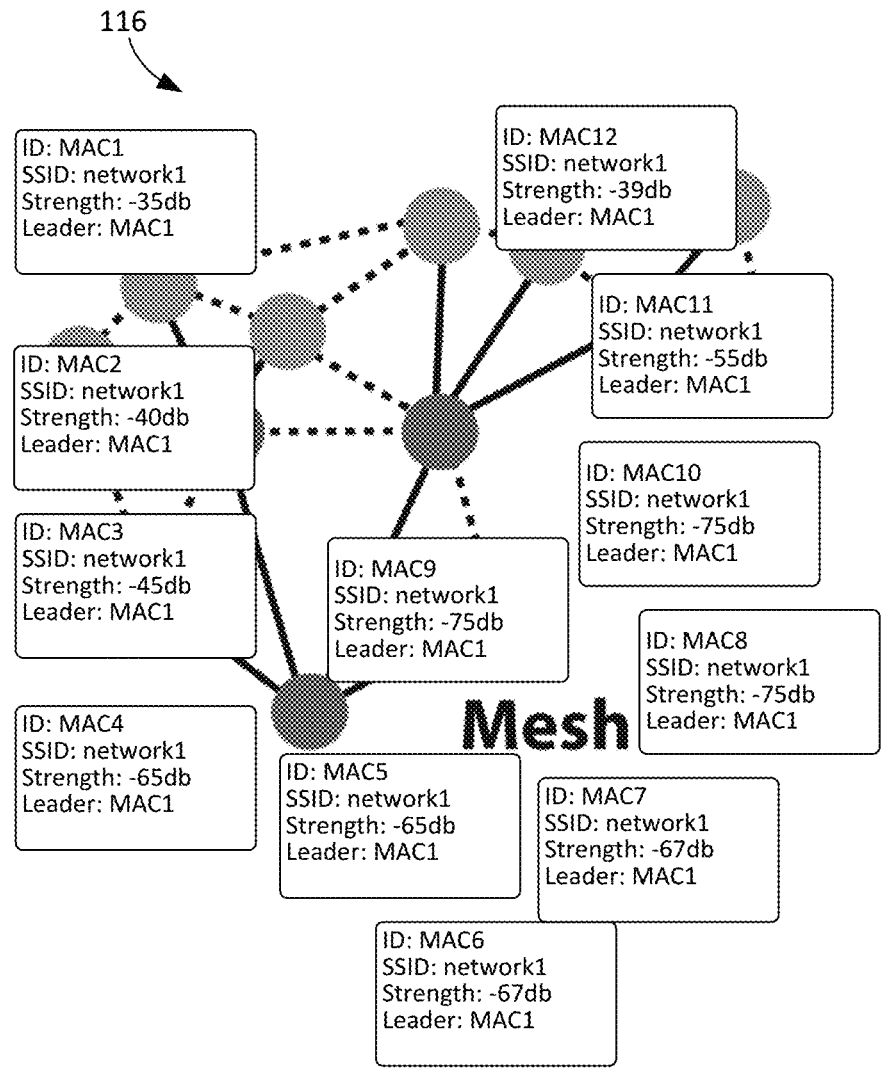

FIGS. 6A-6C illustrate an embodiment of the counter control system of FIG. 2B in which IoT displays 202 of counters 200 are connected to not only mesh network 116 but also to a remote network 602 via router 112. In this embodiment, the IoT displays 202 each have concurrent BLE mesh and WiFi capabilities and are configured to keep track of all WiFi service set identifier (SSID) names and correlated RF signal strength to these stations. The IoT displays 202 share their WiFi signal strength information with each other so as to determine a collective "leader" gateway to elect as the shared WiFi client for the mesh network 116. In this manner, the elected leader serves as a gateway even though the counter control system is gatewayless. If the elected "leader" (e.g., IoT Display #1 in FIGS. 6A-6C) fails, the nodes on mesh network 116, i.e., the other IoT displays 202, will detect the missing leader, and elect another node having the next highest WiFi RF signal strength as the new "leader." FIG. 6C illustrates examples of relative signal strength at the various nodes of mesh 116. The effect of this system is that an IT network would only ever have one device on the WiFi network.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor (s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A system comprising:
   a plurality of food preparation apparatuses, each of the food preparation apparatuses comprising:
   a single board computer communicatively coupled to a wireless mesh network, the mesh network comprising a plurality of nodes, wherein the single board computer is one of the nodes of the mesh network, the single board computer comprising:
   a processor,
   a built-in antenna, and
   one or more memory devices communicatively coupled to the processor,
   the memory devices storing a database containing provisioning and configuration data for at least two of the nodes of the mesh network, the memory devices further storing processor-executable instructions that, when executed by the processor:
   transmit and receive data, via the antenna, on the mesh network,
   generate a control signal for controlling an operation of the food preparation apparatus, and
   communicate the control signal on a physical data bus according to a message-based protocol; and
   an input/output (I/O) circuit communicatively coupled to the single board computer via the physical data bus and configured to receive the control signal therefrom, the I/O circuit responsive to the control signal for driving one or more components of the food preparation apparatus to perform the operation.

2. The system of claim 1, wherein the message-based protocol processor by which the single board computer and the I/O circuit communicate on the physical data bus is a Controller Area Network (CAN) protocol.

3. The system of claim 1, wherein the single board computer comprises a Bluetooth Low Energy (BLE) device and the mesh network comprises a Bluetooth mesh network.

4. The system of claim 1, wherein the configuration data contained in the database includes one or more of the following associated with the I/O circuit: a calibration offset, serial number information, and an address on the physical data bus.

5. The system of claim 1, wherein the food preparation apparatus comprises a touchscreen coupled to the single board computer and configured for interaction with a user thereof.

6. The system of claim 5, wherein the single board computer is responsive to user input received via the touchscreen to generate the control signal.

7. The system of claim 1, wherein the I/O circuit outputs data representative of a state of the food preparation apparatus and the single board computer is responsive thereto to generate the control signal.

8. The system of claim 7, wherein the food preparation apparatus comprises one or more sensors coupled to the I/O circuit, the one or more sensors detecting information regarding the state of the one or more components of the food preparations apparatus.

9. The system of claim 1, further comprising a portable computing device coupled to the mesh network, wherein the portable computing device comprises a proxy node of the mesh network.

10. The system of claim 1, wherein the one or more memory devices further store processor-executable instructions that, when executed by the processor, transmit and receive data, via the antenna, for communicatively coupling the mesh network to an external wireless network via one of the nodes.

11. The system of claim 10, wherein the one or more memory devices further store processor-executable instructions that, when executed by the processor:
    communicate between the single board computers on the mesh network to determine respective signal strength for connection to the wireless network;
    elect which one of the single board computers has greater signal strength; and
    coupling the mesh network to the wireless network via the elected one of the one of the single board computers.

12. The system of claim 1, wherein the plurality of food preparation apparatuses comprises a first food preparation apparatus having a first single board computer and a second food preparation apparatus having a second single board computer, wherein the one or more memory devices further store processor-executable instructions that, when executed by the processor:
    generate, by the second single board computer, the control signal for controlling the operation of the first food preparation apparatus when the first single board computer is no longer on the mesh network; and
    communicate the control signal from the second single board computer to the input/output (I/O) circuit of the first food preparation apparatus.

13. The system of claim 12, wherein the one or more memory devices further store processor-executable instructions that, when executed by the processor:
    replace the first single board computer with a replacement first single board computer, wherein the replacement first single board computer is not provisioned as a node on the mesh network;
    detect, by the second single board computer, the replacement first single board computer;
    retrieve the provisioning and configuration data from the database associated with the second single board computer; and
    provision the replacement first single board computer as a node on the mesh network and configuring the replacement first single board computer for the I/O circuit of the first food preparation apparatus based on the retrieved data.

14. A method of managing a plurality of food preparation apparatuses comprising:
    provisioning at least first and second single board computers as nodes on a mesh network, wherein a first food preparation apparatus includes the first single board computer and a second food preparation apparatus includes the second single board computer;
    storing provisioning and configuration data for each the nodes of the mesh network in a database associated with each of the first and second single board computers;
    generating, by the first single board computer, a control signal for controlling an operation of the first food preparation apparatus associated therewith; and
    communicating the control signal from the first single board computer to a corresponding input/output (I/O) circuit of the first food preparation apparatus, wherein the control signal is communicated via a physical data bus according to a message-based protocol, and wherein the I/O circuit of the first food preparation apparatus is responsive to the control signal for driving one or more components of the first food preparation apparatus to perform the operation.

15. The method of claim 14, further comprising:
when the first single board computer is no longer on the mesh network, generating, by the second single board computer, the control signal for controlling the operation of the first food preparation apparatus; and
communicating the control signal from the second single board computer to the input/output (I/O) circuit of the first food preparation apparatus.

16. The method of claim 14, further comprising:
coupling a portable computing device to the mesh network, wherein the portable computing device comprises a proxy node of the mesh network;
when the first single board computer is no longer on the mesh network, generating, by the portable computing device, the control signal for controlling the operation of the first food preparation apparatus; and
communicating the control signal from the portable computing device via the proxy node to the I/O circuit of the first food preparation apparatus.

17. The method of claim 14, further comprising:
replacing the first single board computer with a replacement first single board computer, wherein the replacement first single board computer is not provisioned as a node on the mesh network;
detecting, by the second single board computer, the replacement first single board computer;
retrieving the provisioning and configuration data from the database associated with the second single board computer; and
provisioning the replacement first single board computer as a node on the mesh network and configuring the replacement first single board computer for the I/O circuit of the first food preparation apparatus based on the retrieved data.

18. The method of claim 14, wherein each of the first and second single board computers is configured for coupling to an external wireless network, and further comprising:
communicating between the first and second single board computers on the mesh network to determine respective signal strength for connection to the wireless network;
electing which one of the first and second single board computers has greater signal strength; and
coupling the mesh network to the wireless network via the elected one of the one of the single board computers.

19. The method of claim 14, further comprising transmitting and receiving data, via an antenna, for communicatively coupling the mesh network to an external wireless network via one of the nodes.

20. The method of claim 14, wherein each of the food preparation apparatuses comprises one or more sensors coupled to the I/O circuit, and further comprising detecting, by the one or more sensors, information regarding a state of the one or more components of the food preparation apparatus.

* * * * *